United States Patent [19]
Cyrulik et al.

[11] Patent Number: 5,532,696
[45] Date of Patent: Jul. 2, 1996

[54] PSEUDO RANDOM JAMMER WITH FALSE TARGET SCINTILLATION CAPABILITY

[75] Inventors: Richard J. Cyrulik, Williamsville; Elmer H. Eckert, Buffalo, both of N.Y.

[73] Assignee: The United States of America as represented by the Secretary of the Air Force, Washington, D.C.

[21] Appl. No.: 508,936

[22] Filed: Sep. 25, 1974

[51] Int. Cl.[6] ........................................ G01S 7/38
[52] U.S. Cl. ........................................ 342/14
[58] Field of Search .................. 343/18 E; 325/132; 342/14

[56] References Cited

U.S. PATENT DOCUMENTS

| | | | |
|---|---|---|---|
| 3,473,126 | 10/1969 | Guenard | 325/132 |
| 3,517,388 | 6/1970 | Vermillion | 325/132 |
| 3,699,575 | 10/1972 | Peters, Jr. et al. | 343/18 E |
| 3,720,944 | 3/1973 | Kramer et al. | 343/18 E |
| 3,760,418 | 9/1973 | Cash et al. | 343/18 E |
| 3,774,208 | 11/1973 | Dorn et al. | 343/18 E |

*Primary Examiner*—Ian J. Lobo
*Attorney, Agent, or Firm*—William G. Auton

[57] ABSTRACT

A pseudo random FM noise jammer that produces scintillation of false targets. A rate and amplitude controlled pseudo random sequence generator is fed to a low pass filter which is resistively coupled to an operational amplifier. A clock pulses a pseudo random generator and both the clock and the pseudo random generator are synchronized by a synchronizing circuit. The output of the operational amplifier is fed to a voltage controlled oscillator and then to an isolator followed by an amplifier.

3 Claims, 1 Drawing Sheet

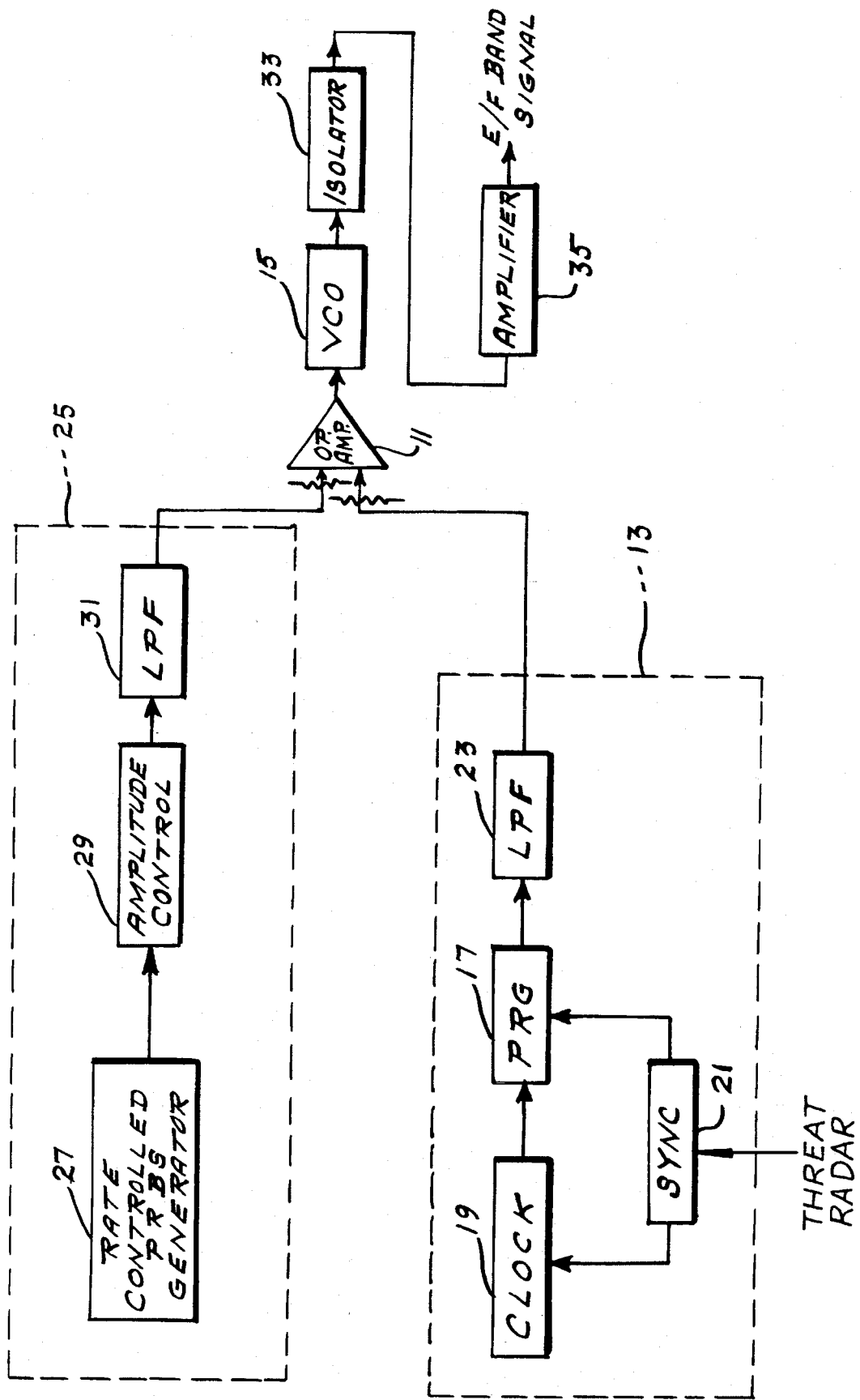

PSEUDO RANDOM JAMMER WITH FALSE TARGET SCINTILLATION CAPABILITY

BACKGROUND OF THE INVENTION

This invention relates to the noise jamming of threat radars, and more particularly to a synchronized pseudo random jammer with false target scintillation.

A military radar operating in a hostile environment may be subjected to deliberate interference, or jamming, which appears as extraneous responses on the radar display. The extraneous responses may be few in number and resemble realtargets, or there may be a large number which fill a significant portion of the display. The purpose of jamming a radar is to create deliberate interference and to degrade its usefulness as part of a weapon system. The various techniques that electronically interfere with radar performance are called electronic countermeasures (ECM). Military radars must be designed not only to perform well in a peacetime environment but to fulfill their mission in time of hostilities in spite of ECM.

Electronic countermeasures can be divided into two classes, depending upon whether they are intended primarily for confusion or for deception. The purpose of a confusion countermeasure is to mask or hide real targets by cluttering the radar display. Its effects are similar to ground or sea clutter except that truly effective confusion ECM usually covers more area on the radar display than does clutter. In fact, effective jamming should completely obliterate the radar screen. An example of a confusion countermeasure is a high power CW transmission modulated by broadband noise.

The purpose of deception ECM is to present to the radar false signals which appear as though they were echoes from real targets. If a sufficiently large number of false targets were to appear on the radar display, the operator might not be able to process them all. Some real targets might be lost, or else the radar operator might direct a weapon to a nonexistent target. An example of a deception countermeasure is the repeater jammer, which plays back to the radar a replica of its own radar signal, but delayed in time, so that it appears displaced in range and/or angle from the true target.

The present invention creates confusion by creating a scintillation-like effect on false targets which makes it extremely difficult for a radar operator to discriminate between true target and false targets.

SUMMARY OF THE INVENTION

A low pass filtered (LPF) pseudo random binary sequence (PRBS) provides the basic modulation to a voltage controlled oscillator that eventually becomes a transmitted jamming waveform. When synchronized to a threat radar a great number of false targets appear at the threat radar display.

In the present invention a second, low frequency, filtered PRBS provides a scintillation-like effect onto the false targets. In effect the false targets are slowly swept about the threat receiver's bandwidth, creating the appearance of scintillating false targets, thereby making it much more difficult for a radar operator to discriminate between the true target and the false targets.

It is therefore an object of this invention to provide a novel and improved pseudo random binary sequence generator for jamming FM transmitters.

It is another object to provide a pseudo random jammer that has false target scintillation capability.

It is still another object to provide a system for generating waveforms that will appear on the display of threat radars as a multiplicity of false targets.

These and other objects, features and advantages of the invention will become more apparent from the following description when taken in connection with the illustrative embodiment in the accompanying drawings.

DESCRIPTION OF THE DRAWINGS

The sole FIGURE is a block diagram showing the synchronized pseudo random jammer with false target scintillation capability.

DETAILED DESCRIPTION OF THE PREFERRED EMBODIMENT

Referring to the sole figure which represents a generic pseudo random noise FM jammer, it is shown that operational amplifier 11 has two inputs which are relatively connected.

Low pass filtered pseudo random jammer sequence generator 13 provides the basic modulation to voltage controlled oscillator 15 that eventually becomes the transmitted jamming waveform. When synchronized to the threat radar, a great number of false targets appear at the display of the threat radar. The techniques for synchronizing a transmitting device to an external radar are well known in the art and are discussed in "Avionics Fights Its Own Silient War", Aviation Week, vol. 67, Nov. 18, 1957, by J. Klass; and "Tools and Techniques of Electronics Warfare", Space Aeronautics, Vol. 33, pp 126–132April 1960, by J. Holahan. Pseudo random binary sequence generator 13 comprises pseudo random generator 17 that is pulsed by clock 19. Synchronization of pseudo random generator 17 is controlled by synchronizing circuit 21 that is connected to clock 19 and pseudo random generator 17. The output of pseudo random generator 17 is filtered through low pass filter 23 and is resistively connected to operational amplifier 11.

By providing a second low frequency filtered pseudo random binary sequence circuit or scintillation generator a scintillation effect is produced upon the false targets which adds to the confusion of the threat radar. Scintillation generator 25 comprises rate controlled pseudo random binary sequence generator 27 which is fed to amplitude control circuit 29 which is then fed to low pass filter 31. The low frequency output from low pass filter 31 is resistively connected to operational amplifier 11.

The output of operational amplifier 11 is fed to voltage controlled oscillator 15 which is generally swept through the E/F bands although other bands can be used. The output of voltage controlled oscillator 15 is fed to oscillator circuit 33 and then to amplifier 34, the output of this circuit being an E/F band signal. In effect the false targets are slowly swept about the threat receiver's bandwidth using voltage controlled oscillator 15, thereby creating the appearance of scintillating false targets. This adds additional difficulty for the radar operator to discriminate between the true target and the false targets.

All of the components used in the invention are conventional in the art and are readily available.

What is claimed is:

1. A pseudo random noise system for jamming a threat radar comprising:

a. a pseudo random generator;

b. clock feeding the pseudo random generator;

c. means for synchronizing the clock and the pseudo random generator to the threat radar;

d. a first low pass filter fed by the pseudo random generator;

e. a scintillation generator; and f. an operational amplifier resistively coupled to the scintillation generator and the first low pass filter.

2. A pseudo random jammer according to claim 1 which further comprises:

a. a voltage controlled oscillator fed by the operational amplifier; and b. an isolating circuit fed by the voltage controlled oscillator.

3. A pseudo random jammer according to claim 2 wherein the scintillation generator comprises:

a. a rate controlled pseudo random binary sequence generator; and b. a second low pass filter fed by the pseudo random binary sequence generator.

* * * * *